United States Patent
Wang et al.

(10) Patent No.: US 9,084,275 B2
(45) Date of Patent: Jul. 14, 2015

(54) SELECTING AN UPLINK-DOWNLINK CONFIGURATION FOR A CLUSTER OF CELLS

(71) Applicant: RESEARCH IN MOTION LIMITED, Waterloo (CA)

(72) Inventors: Yiping Wang, Allen, TX (US); Yi Song, Plano, TX (US); Jun Li, Richardson, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 169 days.

(21) Appl. No.: 13/861,522

(22) Filed: Apr. 12, 2013

(65) Prior Publication Data

US 2014/0307591 A1  Oct. 16, 2014

(51) Int. Cl.
*H04B 7/00* (2006.01)
*H04W 72/12* (2009.01)

(52) U.S. Cl.
CPC .................. *H04W 72/1231* (2013.01)

(58) Field of Classification Search
CPC ............ H04W 72/12; H04W 72/1268; H04W 72/1273
USPC .......... 370/310, 328, 329, 345; 455/422, 450, 455/452
See application file for complete search history.

(56) References Cited

U.S. PATENT DOCUMENTS

| | | | |
|---|---|---|---|
| 8,825,062 B2 * | 9/2014 | Zasowski et al. | 455/446 |
| 2011/0200029 A1 * | 8/2011 | Farmandar et al. | 370/338 |
| 2011/0294527 A1 * | 12/2011 | Brueck et al. | 455/466 |
| 2012/0039314 A1 | 2/2012 | Osborn et al. | |
| 2012/0071200 A1 * | 3/2012 | Bienas et al. | 455/525 |
| 2013/0242812 A1 * | 9/2013 | Khoryaev et al. | 370/278 |
| 2013/0272169 A1 | 10/2013 | Wang | |
| 2013/0272170 A1 * | 10/2013 | Chatterjee et al. | 370/280 |
| 2013/0301423 A1 * | 11/2013 | Sirotkin et al. | 370/241.1 |
| 2013/0322235 A1 * | 12/2013 | Khoryaev et al. | 370/229 |
| 2014/0204783 A1 * | 7/2014 | Lin et al. | 370/252 |

OTHER PUBLICATIONS

European Patent Office, PCT/ISA/206 Form and Communication Relating to the Results of the Partial International Search for PCT/US2014/031709 mailed Aug. 21, 2014 (7 pages).
3GPP TSG RAN WG1 Meeting #72, R1-130419, St Julian's, Malta, Source: Renesas Mobile Europe Ltd, Title: Discussion on interference mitigation schemes for TDD UL-DL reconfiguration, Agenda Item: 7.3.3.2, Document for: Discussion, Jan. 28-Feb. 1, 2013 (6 pages).
3GPP TSG-RAN WG1 #72, R1-130535, St. Julian's, Malta, Source: CMCC, Title: On flexible TDD UL-DL configuration, Agenda item: 7.3.3.3, Document for: Discussion and Decision, Jan. 28-Feb. 1, 2013 (4 pages).

(Continued)

*Primary Examiner* — Dmitry H Levitan
(74) *Attorney, Agent, or Firm* — Trop Pruner & Hu, P.C.

(57) ABSTRACT

Information associated with a communication condition of at least one cell in a cluster of cells is received, where the communication condition is at least one selected from among a traffic pattern and interference. In response to the received information, a coordinating network node selects an uplink-downlink configuration for use by the cells in the cluster.

22 Claims, 6 Drawing Sheets

(56) References Cited

OTHER PUBLICATIONS

3GPP TSG RAN WG1 Meeting #72bis, R1-130936, Chicago, USA, Agenda Item: 7.2.3.1, Source: Alcatel-Lucent Shanghai Bell, Alcatel-Lucent, Title: Interference Mitigation TDD eIMTA, Document for: Discussion and Decision, Apr. 15-19, 2013 (6 pages).
3GPP TSG RAN WG1 Meeting #72bis, R1-131161, Chicago, USA, Agenda Item: 7.2.3.1, Source: Huawei, HiSilicon, Title: CCIM for TDD eIMTA, Document for: Discussion and Decision, Apr. 15-19, 2013 (4 pages).
3GPP TS 36.211, V11.1.0, 3RD Generation Partnership Project; Technical Specification Group Radio Access Network; Evolved Universal Terrestrial Raedio Access (E-UTRA); "Physical Channels and Modulation"; Release 11, Feb. 2013, (109 pages).
3GPP TS 36.213, V11.2.0; 3rd Generation Partnership Project; Technical Specification Group Radio Access Network; Evolved Universal Terrestrial Radio Access (E-UTRA); "Physical Layer Procedures", Release 11; Feb. 2013, (173 pages).
3GPP TS 36.212, V11.2.0; 3rd Generation Partnership Project; Technical Specification Group Radio Access Network; Evolved Universal Terrestrial Radio Access (E-UTRA); "Multiplexing and Channel Coding," Release 11; Feb. 2013, (82 pages).
3GPP TS 36.306, V11.3.0; 3rd Generation Partnership Project; Technical Specification Group Radio Access Network; Evolved Universal Terrestrial Radio Access (E-UTRA); "User Equipment (UE) Radio Access Capabilities, " Release 11; Mar. 2013, (27 pages).
3GPP TSG-RAN Meeting #50; RP-101265, Source: Ericsson; "New Study Item Proposal for UL-DL Flexibility and Interference Management in LTE TDD", for approval; Agenda Item 12.2; Istanbul, Turkey, Dec. 7-10, 2010; (5 pages).
3GPP TSG-RAN Meeting #51; RP-110440, Source: CATT, Ericsson; "New Study Item Proposal for Further Enhancements to LTE TDD for DL-UL Interference Management and Traffic Adaptation," for approval; Agenda item 14.2; Kansas City, USA, Mar. 15-18, 2010, (6 pages).
TSG SA WG4 Meeting #68 Document List; Apr. 16-20, 2012; (19 pages).
3GPP TS 36.331, V11.30.0; 3rd Generation Partnership Project; Technical Specification Group Radio Access Network; Evolved Universal Terrestrial Radio Access (E-UTRA); "Radio Resource Control (RRC)"; Protocol Specification, Release 11); Mar. 2013; (344 pages).
3GPP TR 36.828 V11.0.0; 3rd Generation Partnership Project; Technical Specification Group Radio Access Network; Evolved Universal Terrrestrial Radio Access (E-UTRA); "Further Enhancements to LTE Time Division Duplex (TDD) for Downlink-Uplink (DL-UL) Interference Management and Traffic Adaptation", (Release 11), Jun. 2012, (109 pages).
3GPP TSG-RAN WG1 #68 bis, R1-121529; Agenda Item: 7.10.1; Source—Intel Corporation; "Performance Analysis of DL-UL Interference Management and Traffic Adaptation in Multi-Cell Pico-Pico Deployment Scenario," for Discussion and Decision; Jeju, Korea, Mar. 26-30, 2012, (12 pages).
3GPP TSG RAN WG1 Meeting #69, R-1122061, Source: CATT; "Discussion on Interference Mitigation Schemes for FS_LTE_TDD_eIMTA", Agenda item 7.10.1, For Discussion and Decision; Prague, Czech Republic, May 21-25, 2012; (2 pages).
3GPP TSG RAN WG1, Meeting #69, R1-122879, Source: CATT; "Evaluation on TDD UL/DL Reconfiguration with Interference Mitigation in Multi-Cell Pico Scenario"; Agenda item 7.10.1; For Discussion and Decision; Prague, Czech Republic, May 21-25, 2012; (12 pages).
Wang et al, U.S. Appl. No. 13/855,201; Communication In The Presence Of Uplink-Downlink Configuration Change; filed Apr. 2, 2013; (52 pages).
3GPP TSG-RAN Meeting #51, RP-110450, Source: CATT; "New Study Item Proposal for Further Enhancements to LTE TDD for DL-UL Interference Management and Traffic Adaptation," Agenda item: 14.2; Mar. 15-18, 2010 (6 pages).
Wang et al., U.S. Appl. No. 13/448,212 entitled "HARQ for Dynamic Change of the TDD UL/DL Configuration in LTE TDD Systems" filed Apr. 16, 2012 (46 pages).
European Patent Office, Notification of Transmittal of the International Search Report and the Written Opinion of the International Searching Authority, or the Declaration for PCT/US2014/031709 mailed Oct. 16, 2014 (18 pages).
RAN Working Group 3 meeting #53bis, R3-061530, Agenda Item: 7.5.1, Source: NEC, Title: Self optimisation Scenarios, Document for: Discussion and Approval, Seoul, Korea, Oct. 10-13, 2006 (4 pages).

\* cited by examiner

| Uplink-Downlink Configuration | Downlink-to-Uplink Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1

SELECTING AN UPLINK-DOWNLINK CONFIGURATION FOR A CLUSTER OF CELLS

BACKGROUND

In a wireless communication system, downlink and uplink transmissions of information (control signaling or data) can be according to either a frequency division duplex (FDD) mode or a time division duplex (TDD) mode. In the FDD mode, uplink and downlink transmissions are separated in the frequency domain, by transmitting uplink data using a first carrier frequency, and transmitting downlink data using a second carrier frequency. In the TDD mode, on the other hand, both uplink and downlink transmissions occur on the same carrier frequency; however, uplink and downlink transmissions are separated in the time domain, by sending uplink and downlink transmissions in different time periods.

In some wireless communications systems, different uplink-downlink configurations may be defined. A particular uplink-downlink configuration can specify that, within a frame, a first subset of subframes in the frame is used for uplink transmissions, and a second subset of subframes in the frame is used for downlink transmissions. Different uplink-downlink configurations can employ different numbers of uplink and downlink subframes.

BRIEF DESCRIPTION OF THE DRAWINGS

Some embodiments are described with respect to the following figures:

FIG. 1 is a schematic diagram of different uplink-downlink configurations, according to some examples;

DETAILED DESCRIPTION

Figures 2A, 2B:
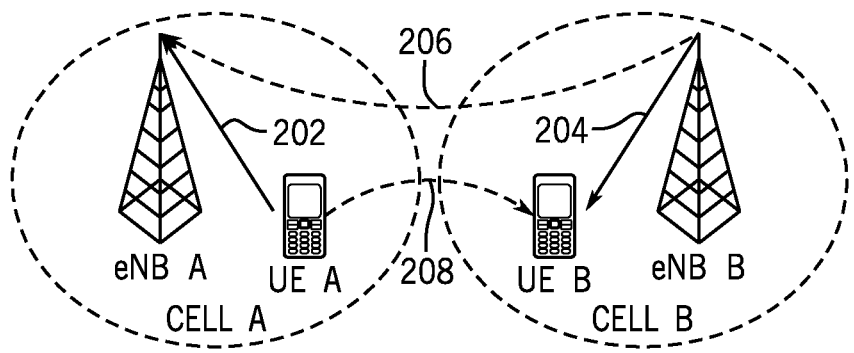
FIGS. 2A-2B are schematic diagrams illustrating an example scenario in which inter-cell interference can occur.

In a wireless communications network, different time division duplex (TDD) mode configurations may be employed. Such configurations can be referred to as TDD uplink-downlink configurations (or more simply, uplink-downlink configurations), such as those used in a Long Term Evolution (LTE) network that operates according to LTE standards provided by the Third Generation Partnership Project (3GPP). The LTE standards are also referred to as the Evolved Universal Terrestrial Radio Access (E-UTRA) standards. Although reference is made to LTE (or E-UTRA) in the ensuing discussion, it is noted that techniques or mechanisms according to some implementations can be applied to other wireless access technologies.

An uplink-downlink configuration defines a number of uplink and downlink subframes that can be used within a frame structure. According to E-UTRA, a frame structure is referred to as a radio frame, where the radio frame has a number of subframes. A subframe refers to a segment of an overall frame, where the segment has a specified time interval.

FIG. 1 shows an example table listing seven different uplink-downlink configurations that are used for TDD communications in an E-UTRA network. A first column 102 of the table shown in FIG. 1 identifies the seven different uplink-downlink configurations (0-6). A second column 104 refers to the corresponding downlink-to-uplink switch-point periodicity (or more simply, "switching periodicity"), which represents a period in which the same switching pattern is repeated between the uplink and the downlink. According to E-UTRA, the switching periodicity can be 5 milliseconds (ms) or 10 ms. Uplink-downlink configuration 1 has a 5 ms downlink-to-uplink switch-point periodicity, for example.

As depicted in a third column 106 in the table of FIG. 1, a frame is divided into 10 subframes, having subframe numbers 0-9. In the table, "D" represents a downlink subframe, "U" represents an uplink subframe, and "S" represents a special subframe which includes three parts: a downlink pilot time slot (DwPTS), an uplink pilot time slot (UpPTS), and a guard period (GP). Downlink transmissions on a physical downlink shared channel (PDSCH) can be made in a D subframe or in the DwPTS portion of a special subframe. The guard period (GP) of a special (S) subframe is to provide a transition interval between switching from downlink transmissions to uplink transmissions.

In the ensuing discussion, a "downlink" subframe can refer to either a D subframe or an S subframe.

As can be seen in FIG. 1, certain uplink-downlink configurations support a larger number of downlink subframes than uplink subframes, while other uplink-downlink configurations may support a larger number of uplink subframes than downlink subframes. Uplink-downlink configuration 5 has the largest number of downlink subframes, while uplink-downlink configuration 0 has the largest number of uplink subframes.

The different uplink-downlink configurations provide for flexibility in terms of proportional resources assignable to uplink and downlink communications within a given assigned frequency spectrum. The different uplink-downlink configurations allow for distribution of radio resources unevenly between uplink and downlink communications. As a result, radio resources may be used more efficiently by selecting an appropriate uplink-downlink configuration based on traffic characteristics and interference conditions in uplink and downlink communications.

For some applications, the proportion of uplink and downlink traffic data (e.g. web browsing data, voice data, network gaming, etc.) may change relatively rapidly. In an E-UTRA system, an uplink-downlink configuration for TDD mode communication can be semi-statically assigned every specified time interval. A wireless access network node can announce a change of the TDD uplink-downlink configuration using system information (e.g. System Information Block Type 1 or S1B1) broadcast to UEs within the coverage area of the wireless access network node. The allowable minimum system information change periodicity is 640 milliseconds (ms), according to the E-UTRA standards. In other words, within the 640-ms time interval, the uplink-downlink configuration assigned for communications within a particular cell stays static. However, keeping the uplink-downlink configuration static for such a relatively long time interval may not lead to efficient use of radio resources, particularly when the number of UEs is small and the traffic patterns of UEs within a cell are changing relatively rapidly.

In accordance with some implementations, dynamic TDD uplink-downlink reconfiguration is provided, in which uplink-downlink configurations for communications with a UE can be changed relatively frequently (more frequently than allowed by current E-UTRA standards). More specifically, techniques or mechanisms are provided to dynamically change TDD uplink-downlink configurations on a cell cluster basis, where a cell cluster includes a number of cells.

In some network implementations, small cells can be provided. A small cell has a relatively small coverage area, smaller than a macro cell. A macro cell refers to a regular cell deployed by a network operator. Examples of small cells include femto cells, pico cells, micro cells, or any other cell that provides a coverage area that is smaller than that provided by a macro cell. Small cells can be used in stadiums, shopping malls, homes, campuses of a business, educational organization, or government agency, or other locations where it is desirable to provide a relatively large number of cells within a geographic area.

In some examples, small cells can operate within coverage areas of macro cells. In other examples, small cells do not operate within coverage areas of macro cells.

An issue associated with performing dynamic TDD uplink-downlink reconfiguration (change of uplink-downlink configurations) is that neighbor cells may use different uplink-downlink configurations, which can lead to interference among wireless access network nodes and interference among UEs in the neighbor cells.

FIGS. 2A-2B illustrate an example scenario in which interference can occur between wireless access network nodes and between UEs in different cells (cell A and cell B depicted in FIG. 2A) that employ different uplink-downlink configurations. In an E-UTRA network, a wireless access network node is referred to as an enhanced Node B (eNB). An eNB can include functionalities of a base station and a radio network controller. Although reference is made to eNBs in the ensuing discussion, it is noted that techniques or mechanisms according to some implementations can be applied with other types of wireless access network nodes that employ communications according to other wireless access technologies.

In the example where cell A and cell B employ different uplink-downlink configurations, there may be at least one given subframe in which cell A communicates in one direction (uplink or downlink direction) while cell B communicates in the opposite direction (the other one of the uplink or downlink direction). FIG. 2B shows an example in which cell A uses uplink-downlink configuration 0, and cell B uses uplink-downlink configuration 1. Subframe 4 is an example of a subframe in which cell A performs uplink communications, while cell B performs downlink communications. Subframe 9 is another example of such a situation.

In a network in which TDD communications are used, the cells can be time synchronized, in which case the communications in opposite directions in cells A and B in subframe 4 or 9 can result in interference between eNB A and eNB B, or interference between UE A and UE B. In the example where cell A uses uplink-downlink configuration 0, and cell B uses uplink-downlink configuration 1, in subframe 4, UE A performs an uplink transmission (202) to eNB A in cell A, while the eNB B performs a downlink transmission (204) to UE B in cell B. As a result, the uplink reception (202) at eNB A in cell A can be subjected to interference from the downlink transmission (204) in cell B (this interference is depicted with dashed arrow 206). Interference 206 is an example of an eNB-to-eNB inter-cell interference.

In addition, the uplink transmission (202) by UE A in cell A may interfere with downlink reception (204) by UE B in cell B (this interference is represented by dashed arrow 208 in FIG. 2A). Interference 208 is an example of a UE-to-UE inter-cell interference.

To mitigate the foregoing types of interference, a cell clustering interference mitigation (CCIM) technique can be implemented. The CCIM technique forms clusters of cells, where cells within a cluster employ the same uplink-downlink configuration. The CCIM technique attempts to provide isolation between cell clusters so that eNB-to-eNB interference and UE-to-UE interference as discussed above is mitigated. Different clusters can use different uplink-downlink configurations. In some implementations, the member cells of a cluster are small cells.

Generally, the current 3GPP standards do not provide details relating to determining and coordinating an uplink-downlink configuration to be used in a cluster of cells. Moreover, other issues that are to be addressed include one or more of the following:

forming a cluster of cells;
 performing dynamic cell clustering to match traffic patterns; and
 providing information to facilitate the network to determine the uplink-downlink configuration.

Uplink-Downlink Configuration Management for a Cluster

To perform management of uplink-downlink configuration within a cluster of cells, a coordinating network node can be employed. In some implementations, the coordinating network node is the eNB of an anchor cell, which is one of the cells of the cluster. In the ensuing discussion, a cell that is a member of a cluster of cells is referred to as a member cell. In other implementations, the coordinating network node is an eNB of a macro cell that can be overlaid with the cluster of cells.

An anchor cell is a cell within a cluster that is designated to perform designated management tasks with respect to the cluster. In some examples, the anchor cell is a cell that has a fixed location and is continually active. For example, the anchor cell does not normally turn off, such as for power savings or other reasons. The designation of an anchor cell within a cluster can be provisioned using an Operations, Administration, and Maintenance (OAM) procedure, based on specified cell planning criteria, such as geographical distances among cells of the cluster, and other criteria. Effectively, the anchor cell can be the coordinating cell that coordinates with other cells in the cluster, or with other clusters. In addition, the designation of a coordinating network node can also be provisioned using an OAM procedure.

Figure 3:
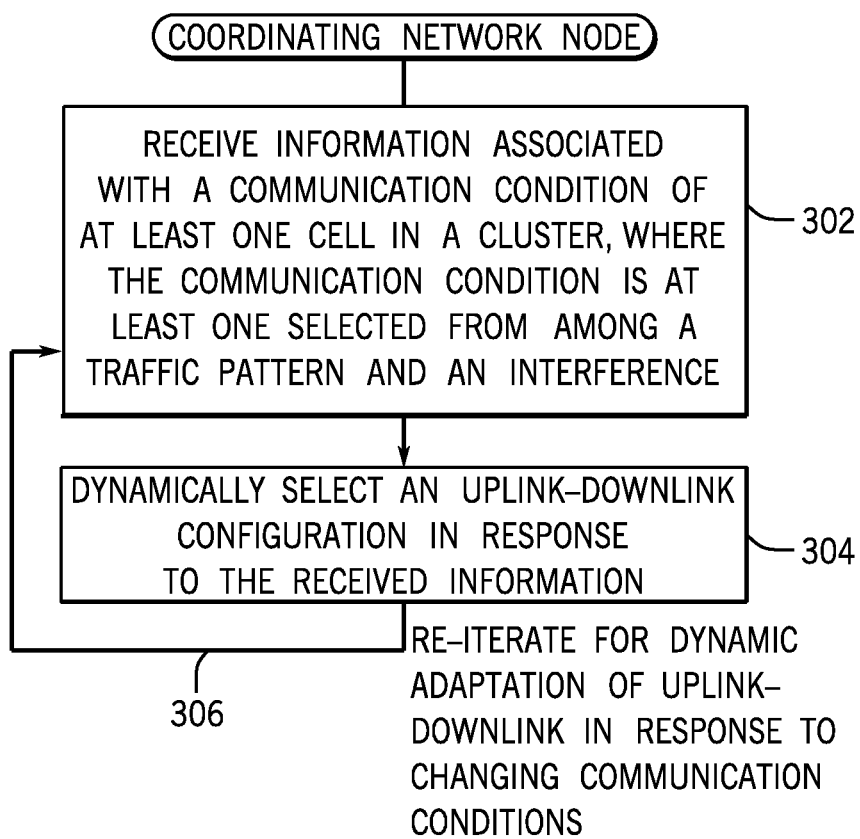
FIG. 3 is a flow diagram of a process of selecting an uplink-downlink configuration for a cluster of cells, according to some implementations.

FIG. 3 is a flow diagram of a process performed by the coordinating network node according to some implementations. The coordinating network node receives (at 302) information associated with a communication condition of a least one member cell in a cluster of cells, where the communication condition can include at least one selected from among a traffic pattern of the at least one member cell, and an interference experienced in the at least one member cell. In some examples, the received information can include statistics regarding the traffic pattern (discussed further below). The received information can alternatively or additionally include a measure of interference experienced in a member cell, where the measure can be based on a rise-over-thermal (ROT) interference power from another cell (such as one neighboring cell), based on a measured level (e.g. power, amplitude, etc.) of a reference signal (e.g. cell reference signal) from another cell, and so forth. In other examples, the received information can be a proposed uplink-downlink configuration from a member cell.

The coordinating network node selects (at 302) an uplink-downlink configuration for use by the cells in the cluster, in response to the received information. For example, if the received information includes statistics regarding the traffic pattern that indicates a larger amount of uplink traffic as compared to downlink traffic in the cluster, then the coordinating network node can select an uplink-downlink configuration that has a larger number of uplink subframes, such an uplink-downlink configuration 0 in FIG. 1.

As another example, if the received information includes a measure of interference indicating that a member cell is experiencing excessive interference (greater than a specified threshold, for example) from another cell (the "interfering cell") during a specific subframe, the coordinating network node can adapt the uplink-downlink configuration of the member cell such that the communication direction (uplink or downlink) of the member cell in the specific subframe is consistent with (same direction as) the communication direction of the interfering cell, to mitigate the interference.

In other examples, if the received information includes proposed uplink-downlink configurations from member cells, then the coordinating network node can select one of the proposed uplink-downlink configurations, or a different uplink-downlink configuration.

The coordinating network node can re-iterate (at 306) the process of FIG. 3, to perform dynamic adaptation of the uplink-downlink configuration for the cluster in response to changing communication conditions (e.g. changing traffic patterns or changing interference, or both) in the cluster.

In the ensuing discussion, reference is made to adapting uplink-downlink configurations to traffic patterns. Note that techniques or mechanisms are also applicable to adapting uplink-downlink configurations to interference, or to both interference and traffic patterns.

The adaptation of an uplink-downlink configuration to communication conditions in the FIG. 3 process can use one of the following approaches (referenced as Approach 1, Approach 2, and Approach 3, in some examples).

In Approach 1, which is a centralized approach, each UE served by a member cell in the cluster reports measured statistics regarding a traffic pattern to the member cell. The statistics regarding traffic patterns reported by UEs to the member cell provide indications of the relative amounts of uplink and downlink data in communications performed in the member cell.

The statistics can be reported in new signaling (signaling not defined by current 3GPP standards) to the member cell. Alternatively, the statistics can be reported by UEs in new information elements in existing signaling (signaling defined by current 3GPP standards) to the member cell.

Traffic pattern statistics can include buffer status and packet delay in both the downlink and uplink. Each of an eNB and a UE can include a buffer. The eNB can include a downlink buffer for temporarily storing (buffering) downlink data waiting to be sent to a UE. Note that the eNB can include multiple downlink buffers, one for each UE served by the eNB. A UE can include an uplink buffer for temporarily storing uplink data waiting to be sent to the eNB. A downlink buffer status can be represented by an average amount of downlink data in the downlink buffer at the eNB. An uplink buffer status can be represented by an average amount of uplink data in the uplink buffer at the UE.

The buffer status can provide an indication of whether sufficient uplink or downlink resources are allocated. For example, if a downlink buffer status indicates that a relatively large amount of downlink data is waiting to be transmitted, then an uplink-downlink reconfiguration can be performed to change to an uplink-downlink configuration having a larger number of downlink subframes.

Packet delay refers to an average amount of delay in sending a data packet between a UE and an eNB. Downlink packet delay refers to an average amount of delay in sending a downlink data packet (the average time between a downlink data packet arriving at the eNB to the packet received at the UE). Uplink packet delay refers to an average amount of delay in sending an uplink data packet (the average time between an uplink data packet arriving at the UE to the packet received at the eNB). If there is excessive packet delay in a given direction (uplink or downlink), then uplink-downlink reconfiguration can be performed to change to an uplink-downlink configuration that has more subframes for transmitting data in the given direction.

The downlink buffer status and downlink packet delay are known at an eNB of a member cell. The uplink buffer status can be reported from a UE to an eNB using a Buffer Status Report (BSR), as defined by current 3GPP standards, or using other signaling. The uplink packet delay information may be reported by the UE to the eNB using a Medium Access Control (MAC) Control Element (CE), or using another type of signaling. Statistics (including the uplink buffer status and packet delay information) from multiple individual UEs can be consolidated at the eNB (of a member cell) to reflect the overall member cell traffic pattern.

Each member cell relays traffic pattern statistics (e.g. uplink buffer status, uplink packet delay) received from UEs served by the member cell, along with other traffic pattern statistics (e.g. downlink buffer status, downlink packet delay) at the member cell, to the coordinating network node, which can be an eNB of the anchor cell or an eNB of the macro cell. In Approach 1, the information received at 302 in FIG. 3 includes the foregoing traffic pattern statistics from member cells.

The reported statistics from the member cells allow the coordinating network node to estimate the relative amounts of uplink traffic and downlink traffic within the cluster of cells. The coordinating network node can then use such determination to decide on the uplink-downlink configuration to use for the cluster.

In alternative implementations, the member cells can report interference information to the coordinating network node, in addition to or instead of the traffic pattern statistics.

In Approach 2, which is a distributed decision-based approach, each UE served by a member cell in the cluster can report statistics regarding a traffic pattern to the member cell. Based on the traffic pattern statistics (e.g. uplink buffer status, uplink packet delay) reported by UEs served by the member cell, and the traffic pattern statistics (e.g. downlink buffer status, downlink packet delay) at the member cell, the member cell can make an initial decision regarding the uplink-downlink configuration to use. The member cell then reports the proposed uplink-downlink configuration to the coordinating network node. With Approach 2, the information received at 302 includes proposed uplink-downlink configurations from member cells of the cluster. The initial decision on the uplink-downlink configuration made by the member cell can be additionally or alternatively based on interference information of the member cell.

The coordinating network node can potentially receive different proposed uplink-downlink configurations from at least some member cells of the cluster. The coordinating network node can select the uplink-downlink configuration for use by the cluster using one of various different techniques. For example, the coordinating network node can use simple voting, in which the uplink-downlink configuration selected is the one that makes up a majority or plurality of the proposed uplink-downlink configurations. For example, if there are five member cells, and three of the five member cells proposed uplink-downlink configuration x (x being a number from 0-6), then the coordinating network node would select the uplink-downlink configuration x as the one to use for the cluster (majority vote). As another example, if there are five member cells, and two of the five member cells proposed uplink-downlink configuration y, while the other three member cells proposed three respective different uplink-downlink configurations, then the selected uplink-downlink configuration for the cluster would be uplink-downlink configuration y (plurality vote).

In other implementations, the selected uplink-downlink configuration can be based on aggregating (e.g. averaging) the uplink-downlink resources of the proposed uplink-downlink configurations. Each uplink-downlink configuration has a first number of uplink subframes and a second number of downlink subframes. An average number (rounded to an integer) of uplink subframes over the multiple proposed uplink-downlink configurations can be calculated, and an average number (rounded to an integer) of downlink subframes over the multiple proposed uplink-downlink configurations can be calculated. The selected uplink-downlink configuration is the one that has the average number of uplink subframes and the average number of downlink subframes.

In further implementations, other techniques can be used for selecting an uplink-downlink configuration for a cluster based on proposed uplink-downlink configurations from member cells.

In Approach 3, which is a coordinating network node-initiated approach, it is assumed that the member cells within a cluster have similar characteristics. This may be true in certain small cell implementations, such as those in a stadium, shopping mall, and so forth. In the case of the coordinating network node being the eNB of an anchor cell, the coordinating network node can make the decision regarding the uplink-downlink configuration to use for the cluster based on traffic pattern statistics in the anchor cell. In other words, the traffic pattern statistics as reported by UEs in the anchor cell are assumed to be representative of traffic pattern statistics in the other cells of the cluster. In the case of the coordinating network node being the eNB of the overlay macro cell, the coordinating network node can randomly choose one member cell in the cluster and make the decision regarding the uplink-downlink configuration to use for the cluster based on traffic pattern statistics in the chosen member cell. With Approach 3, the information received at 302 includes traffic pattern statistics of the anchor cell or the member cell randomly chosen by the coordinating network node. Alternatively, or additionally, the information received at 302 includes interference information of the anchor cell or the member cell randomly chosen by the coordinating network node.

With Approach 3, if a member cell receives a designated uplink-downlink configuration decided by the coordinating network node, and the member cell prefers a different uplink-downlink configuration, the member cell can request a different uplink-downlink configuration. Such request sent to the coordinating network node from the member cell can include traffic pattern statistics of the requesting member cell, a proposed uplink-downlink configuration, or both. The coordinating network node may or may not adjust the uplink-downlink configuration after receiving one or more such requests from member cells.

Figure 4:
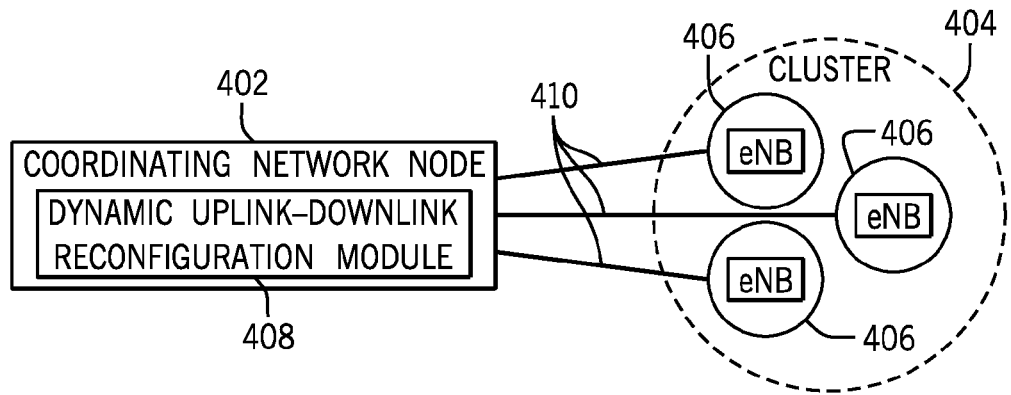
FIG. 4 is a schematic diagram of a network arrangement including a coordinating network node and a cluster of cells, according to some implementations.

FIG. 4 is a block diagram of an example network arrangement that includes a coordinating network node 402 and a cluster 404 of cells 406. Each cell has an eNB. The coordinating network node 402 includes a dynamic uplink-downlink reconfiguration module 408 (implemented as machine-readable instructions, for example) which can perform dynamic uplink-downlink reconfiguration in response to changing traffic patterns in the cell cluster 404. For example, the dynamic uplink-downlink reconfiguration module 408 can perform the process of FIG. 3.

As noted above, the coordinating network node 402 can be an eNB of a member cell 406 in the cluster 404, or alternatively, the coordinating network node 402 can be an eNB of a macro cell. Backhaul links 410 (e.g. X2 interfaces) can be provided between the coordinating network node 402 and the eNBs of the member cells 406.

Uplink-downlink reconfiguration may be event driven or performed periodically. In event-driven implementations, a member cell 406 may monitor the traffic pattern in the member cell. Uplink-downlink reconfiguration can be triggered based on an event relating to the monitoring of the traffic pattern (e.g. traffic pattern at a member cell 406 has changed by more than some specified amount, etc.).

An eNB of a member cell 406 can check the downlink and uplink buffer status and/or downlink and uplink packet delay information against a current uplink-downlink configuration to see if uplink-downlink reconfiguration should be performed. If so, the eNB of the member cell 406 can send traffic pattern statistics or a proposed uplink-downlink configuration to the coordinating network node 402 to trigger a dynamic uplink-downlink reconfiguration for the cluster.

In other examples, uplink-downlink reconfiguration can be performed periodically (at specified time intervals).

The following describes additional details relating to Approach 1, in which member cells report traffic pattern statistics to the coordinating network node 402. Current 3GPP standards provide a mechanism for a UE to report uplink buffer status information (in a BSR, for example) to an eNB. To report uplink packet delay from a UE to an eNB, a new signaling mechanism using a MAC CE can be employed.

To perform periodic uplink-downlink reconfiguration, member cells 406 can report traffic pattern statistics to the coordinating network node 402 on a periodic basis, to cause the coordinating network node 402 to perform the dynamic uplink-downlink reconfiguration. The period can be predefined using higher layer signaling, and may be conveyed over the backhaul link 410 between the coordinating network node 402 and each member cell 406.

Alternatively, dynamic uplink-downlink reconfiguration can be event driven. For example, a member cell 406 can compare current traffic pattern statistics to previously reported traffic pattern statistics. Based on the comparing, the member cell 406 can determine a change in a ratio of uplink traffic to downlink traffic—if the change in the ratio exceeds a specified threshold, then the member cell 406 can send traffic pattern statistics to the coordinating network node 402 to trigger the dynamic uplink-downlink reconfiguration.

Event-driven reporting of traffic pattern statistics from member cells 406 to the coordinating network node 402 can potentially reduce the amount of backhaul signaling over the backhaul link between each member cell 406 and the coordinating network node 402.

Table 1 below depicts examples of backhaul signaling that can be used to deliver traffic pattern statistics from a member cell 406 to the coordinating network node 402. For example, the X2 Load Information message (communicated over the X2 interface) can be modified to add the information elements listed in Table 1 below. In Table 1, the Buffer Statistics information element is used to carry buffer status statistics. Also, a Next Dynamic TDD Configuration information element can be used by the coordinating network node 402 to notify a member cell 406 of a selected uplink-downlink configuration to use.

In addition, the X2 Load Information message can include a Starting SFN for the Next Dynamic TDD Configuration information element to indicate the starting system frame number (SFN) that identifies a radio frame (having any of the configurations depicted in FIG. 1) at which the new uplink-downlink configuration is to start.

Alternatively, the buffer statistics can be included in a new information element of an X2 Resource Status Update message.

TABLE 1

| Information Element | Presence |
|---|---|
| ... | ... |
| >>Buffer Statistics | O |
| >>Next Dynamic TDD Configuration | O |
| >>Starting SFN for the Next Dynamic TDD Configuration | O |

The following describes additional details relating to Approach 2. As discussed above, each member cell 406 makes an initial decision regarding an uplink-downlink configuration to use, based on the traffic pattern statistics of the member cell 406. This is sent as a proposed uplink-downlink configuration to the coordinating network node 402.

In some examples, a proposed uplink-downlink configuration can be included as a new information element in an X2 Load Information message, or in an X2 Resource Status Update message. Based on proposed uplink-downlink configurations from member cells, the coordinating network node 402 can select an uplink-downlink configuration to use, which can be communicated to each member cell 406 of the cluster 404, such as in the modified X2 Load Information message discussed above, or another message.

The following describes additional details relating to Approach 3. The coordinating network node in this approach decides the uplink-downlink configuration to use for the cluster 404 based on the traffic pattern statistics of just the anchor cell or a randomly chosen member cell. The coordinating network node will let member cells know its decision using the modified X2 Load Information message, or another message.

As noted above, the coordinating network node 402 can be the eNB of a macro cell, which is possible in implementations where the cells 406 of the cluster 404 are small cells that are within the coverage area of the macro cell. Such a network implementation is referred to as a macro cell overlay over the small cells.

A potential benefit of implementing the coordinating network node 402 with the eNB of the macro cell is that the macro cell eNB has information relating to a number of neighbor clusters. As a result, the macro cell eNB be able to better coordinate among the neighbor clusters. For example, the macro cell eNB can merge two or more clusters that are employing the same or similar uplink-downlink configurations for better interference management.

Note that merging of clusters is also possible in arrangements where the coordinating network node is implemented with the eNB that is part of the anchor cell. In such implementations, coordinating network nodes of anchor cells of respective clusters can cooperate with each other to decide whether or not to merge the clusters. For example, the coordinating network nodes of anchor cells can exchange the cluster-wide uplink-downlink configurations used in the respective clusters. If the coordinating network nodes of anchor cells determine that the clusters are using the same or similar cluster-wide uplink-downlink configurations, then the coordinating network nodes can make a decision to merge. After merging clusters, the coordinating network nodes can decide which cell of the combined cluster is to be the anchor cell, based on various specified criteria.

Uplink-Downlink Reconfiguration Coordination

Coordination is performed to ensure member cells 406 change an uplink-downlink configuration simultaneously. Changing the uplink-downlink configuration by member cells 406 of the cluster 404 at different times can lead to a situation where a member cell 406 of the cluster 404 can use a different uplink-downlink configuration than another member cell 406 of the cluster 404.

The notification of the uplink-downlink configuration change sent by the coordinating network node 402 can be associated with information pertaining to when the uplink-downlink configuration change is to be applied by the member cells 406. For example, the information sent to the member cells 406 by the coordinating network node 402 can include the starting system frame number (SFN) that identifies the radio frame at which the uplink-configuration change is to be applied—in other words, the SFN that identifies the radio frame in which the new uplink-downlink configuration is to be first used. In some examples, such information can be the Starting SFN for the Next Dynamic TDD Configuration information element that is included in an X2 Load Information message, as depicted in Table 1 above.

Since the SFNs may not be synchronized among the coordinating network node and the member cells in the cluster, to properly set the starting SFN at the member cell, the coordinating network node 402 is provided with information relating to the SFN offset between the coordinating network node 402 and each of the member cells 406. The SFN offset refers to the number of radio frames that corresponds to the SFN shift between the coordinating network node 402 and the member cell 406. Enough guard time is provided to cover the backhaul link delay when the coordinating network node 402 sets the starting SFN for application of the new uplink-downlink configuration.

Cell Cluster Management

The foregoing discussed various techniques or mechanisms relating to management and coordination of uplink-downlink reconfiguration for a cluster of cells. The ensuing discussion refers to techniques or mechanisms relating to forming and maintaining a cell cluster, such as 404 in FIG. 4.

A cell cluster 404 can be assigned a unique cell cluster identifier (CCID). The cell cluster 404 can have one cell that is designated as the anchor cell. In some examples, the anchor cell is a cell that has a fixed location and is continually active. The designation of an anchor cell within a cluster can be provisioned using an Operations and Maintenance (OAM) procedure, based on specified cell planning criteria, such as geographical distances among cells of the cluster, and other criteria. The choice of the anchor cell may be different depending on the deployment scenario. For multiple small cell clusters without macro cell coverage, an anchor cell for each cluster may be chosen from a set of cells with fixed locations.

Cells within a cell cluster have the same CCID and employ the same uplink-downlink configuration. Cells are time synchronized, but cells belonging to different cell clusters may or may not use the same uplink-downlink configuration.

New Cell Operation

The following describes examples in which a new cell is to determine which cluster the new cell is to join. In some examples, a new cell is a cell that is starting up (e.g. powering up) and the cell has not been provisioned to be part of any cell cluster.

The new cell has to decide which cell cluster to join if there are multiple cell clusters. To make this decision, a set of candidate CCIDs corresponding to the multiple cell clusters is acquired by the new cell. Each cell cluster is assumed to have an active anchor cell. The new cell may also be provided with identification information of the anchor cell of each cluster, such as global eNB identifier or global cell identifier of the anchor cell. Such identification information of an anchor cell facilitates the subsequent communication with the anchor cell.

Figure 5:
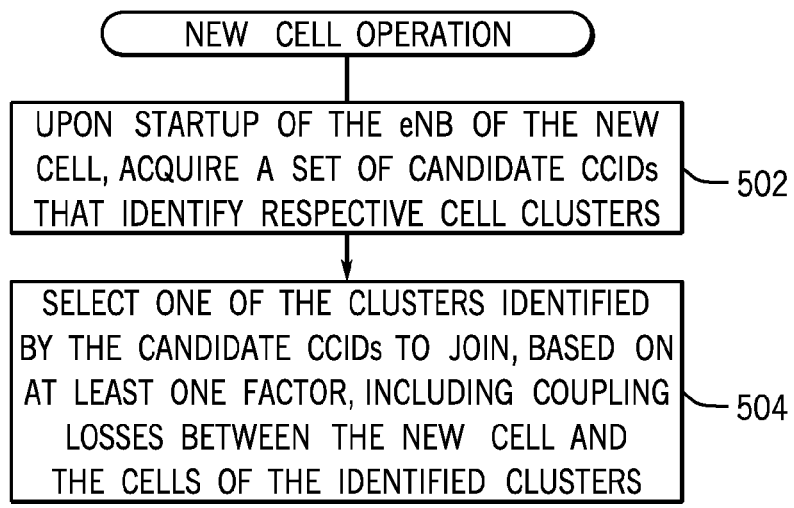
FIG. 5 is a flow diagram of a process of a new cell, according to some implementations.

FIG. 5 is a flow diagram of a process of a new cell, according to some implementations. Upon startup of the eNB of the new cell, the new cell eNB acquires (at 502) a set of candidate CCIDs that identify respective cell clusters. The new cell eNB can then select (at 504) one of the cell clusters identified by the candidate CCIDs, based on at least one factor, which can include coupling losses between the new cell and cells of the identified cell clusters.

A new cell may acquire the set of candidate CCIDs using at least one of following techniques: (1) CCIDs obtained from an OAM server; (2) CCIDs obtained over a backhaul link (e.g. X2 interface); and (3) CCIDs obtained over the air (i.e. obtained wirelessly).

In Technique 1, the set of candidate CCIDs of corresponding cell clusters is provided from an OAM server of the wireless communications network, such as part of a datafill of the OAM sever. During the startup phase of the new cell, this datafill of the OAM server can be pushed to the new cell.

In Technique 2, the new cell obtains the set of candidate CCIDs over the backhaul link (e.g. X2 interface) between the new cell and another cell. The set of candidate CCIDs can be included X2 signaling provided over the backhaul link. For example, when a new small cell initially powers up, the new small cell can communicate with a neighbor small cell or the overlay macro cell to set up or update the X2 interface. The newly activated small cell may request the neighbor small cell or the overlay macro cell to provide the set of candidate CCIDs during the X2 setup/update procedure. In specific examples, the request for the set of candidate CCIDs may be included in an X2 eNB Configuration Update message, which can be configured to have new information elements as depicted in Table 2 below.

In Table 2, the CCID Request Indication information element of the X2 eNB Configuration Update message is an indication that the cell that transmitted the message is requesting a set of candidate CCIDs. Alternatively, the request can be included in the X2 Setup Request message, or some other message that can be sent over the backhaul link.

Table 2 also shows that the X2 eNB Configuration Update message can also be modified to include an UL/DL Configuration Request Indication information element, which can be sent by a cell to request the uplink-downlink configuration used by the cell cluster identified by each respective candidate CCID. Alternatively, such an information element can be added to the X2 Setup Request message.

TABLE 2

| Information Element | Presence | IE Type and Reference |
| --- | --- | --- |
| >CCID Request Indication | ○ | ENUMERATED(request CCID, . . .) |
| >UL/DL Configuration Request Indication | ○ | ENUMERATED(request TDDConfig, . . .) |

In response to the request for set of candidate CCIDs, the set of candidate CCIDs may be provided in an X2 Configuration Update Acknowledge message, modified to include information elements as shown in Table 3 below.

TABLE 3

| Information Element | Presence | IE Type and Reference |
| --- | --- | --- |
| Candidate Cluster Information | | |
| >CCID | ○ | |
| >UL/DL Configuration | ○ | ENUMERATED(sa0, sa1, sa2, sa3, sa4, sa5, sa6, . . .) |

The Candidate Cluster Information element of Table 3 includes one or more candidate CCIDs to be provided to the requesting cell. In alternative examples, the set of candidate CCIDs can be provided in the X2 Setup Response message.

Table 3 also shows that the X2 Configuration Update Acknowledge message can include an UL/DL Configuration information element, which identifies the uplink-downlink configuration used by the cell cluster identified by each respective candidate CCID. Alternatively, this information element may also be added to an X2 Setup Response message.

In another alternative, if a small cell was previously turned off to conserve energy, the overlay macro eNB or the neighbor small cell may send an X2 Cell Activation Request message to turn on the powered up small cell for traffic offloading. In this case the set of candidate CCIDs may be provided in Cell Activation Request message.

In alternative implementations, with Technique 3, the set of candidate CCIDs can be obtained from surrounding cells over the air. To do so, the new cell has a downlink receiver to receive downlink signals transmitted by another cell.

With Technique 3, two alternative deployment scenarios are considered. A first deployment scenario involves small cells without macro cell coverage. A second deployment scenario involves small cells with macro cell coverage.

In the first deployment scenario of Technique 3 (case where no macro cell coverage is present), the new small cell searches for CCID information from neighbor small cells. The new small cell may decode the CCID information from system information or a synchronization signal, or both, of a neighbor small cell. An explicit or an implicit method can be used to obtain the CCID. It is also possible that all cells in the cluster would broadcast the same CCID.

The CCID information can be added in existing system information which is already being broadcast by cells. One example is to use spare bits in a Master Information Block (MIB) that is broadcast by a cell. The MIB contains various parameters that are used to acquire other information from the cell.

For example, in the MIB, a field, referred to as CCID that is 3 bits in length, can be used to indicate the CCID of each individual cell. In other examples, the CCID field in the MIB can have a different length. Using a 3-bit CCID field in the MIB, the maximum number of different cell clusters that can be identified is eight. The MIB can use a fixed schedule with a periodicity of 40 ms, and repetitions of the MIB can be made within the 40-ms period. The first transmission of the MIB is scheduled in subframe 0 of each radio frame for which the SFN mod 4=0, and repetitions are scheduled in subframe 0 of all other radio frames, in some examples.

Alternatively, the CCID field can be included in a different message transmitted by a cell. For example, the CCID field can be included into a system information block (SIB). For example, a CCID field can be included in SIB type 1 (SIB1). SIB1 can use a fixed schedule with a periodicity of 80 ms, and repetitions can be made within the 80-ms period. The first transmission of SIB1 is scheduled in subframe 5 of radio frames for which SFN mod 8=0, and repetitions are scheduled in subframe 5 of all other radio frames for which SFN mod 2=0.

The foregoing refers to explicitly identifying the CCID in a CCID field of a message sent by a cell. Alternatively, an implicit method of communicating a CCID can be used. A new small cell can look for a Physical Cell ID (PCI) sent in a synchronization signal of neighbor small cells. With appropriate PCI planning, a CCID of a given cell can be derived from the PCI of the given cell. For example, PCI values of cells within the same cluster can be designed such that PCI (of each cell in the cluster) mod c produces the same CCID. The parameter c is a predefined number and depends on the number of cell clusters in the network. The larger the number of cell clusters, the larger value of c.

In this case, when the new small cell detects the PCI of another small cell, the new small cell is able to derive the CCID from the detected PCI value.

The foregoing describes the first deployment scenario of Technique 3 (case where no macro cell coverage is present). An alternative implementation is the second deployment scenario of Technique 3 (case where macro cell coverage is present). In the first deployment scenario of Technique 3, techniques described above in connection with the first deployment scenario of Technique 3 can be used.

In addition, the eNB of the macro cell can act as a central control point to broadcast the set of candidate CCIDs to the new small cell. This set of candidate CCIDs may be included in an SIB1 message broadcast by the macro cell. For example, a new field, referred to as CCIDList, can be added to SIB1, where the CCIDList field includes the CCIDs of all cell clusters within the macro cell coverage.

After acquisition (at 502 of FIG. 5) of the set of candidate CCIDs, the new cell selects (at 504 in FIG. 5) one of the identified cell clusters to join. In some implementations, a goal of selecting a cell cluster to join is to maintain the best isolation among cells. The foregoing assumes that the eNB of the new small cell has a downlink receiver to receive downlink signaling of other eNBs. For example, the eNB of the new small cell can measure cell-specific reference signals (CRS) of neighbor cells to obtain the coupling loss (or path loss) between the new cell and each visible neighbor cell.

It is assumed that there are N (N>1) cell clusters in the area, and the nth (n selected from among 1 to N) cell cluster includes $I_n$ cells. The coupling losses between the new cell and each cell in the nth cell cluster, denoted as $CL_n$, can be ranked in ascending order as given by, $$CLSet_n = [CL_n(1), CL_n(2), \ldots, CL_n(I_n-1), CL_n(I_n)].$$
$$n=1, 2, \ldots, N.$$

In the foregoing, $CL_n(m)$, m=1 to $I_n$, represents the coupling loss between the new cell and the mth cell in the nth cell cluster.

The choice of cluster to join can be based on the average value over first M $CL_n$s in the above set, $CLSet_n$, which is denoted as, $$AvCLSet_n = \frac{1}{M}\sum_{m=1}^{M} CL_n(m),$$

where M is a predefined number within (0, $I_n$]. M can be either the same or different value for different cell clusters. If M is the same for all cell clusters, then M≤min($I_1$, $I_2$, . . . , $I_N$).

The new cell may choose the cell cluster associated with the smallest $AvCLSet_n$ to join. Other techniques are also possible to use for choosing the cell cluster to join. In some cases, when $AvCLSet_n$ values of different cell clusters are relatively close, it can be hard to make a decision based on just the $AvCLSet_n$ values. In such cases, other factors can be considered, such as the currently used uplink-downlink configuration in each cell cluster, any restrictions on uplink-downlink configurations that can be used in each cell cluster, traffic intensity in each cell cluster, and environment factors.

The selection of the cell cluster to join by the new cell can be reported to the anchor cell of the selected cell cluster so that the anchor cell can include the new cell when the anchor cell performs dynamic uplink-downlink reconfiguration.

As noted above, one possible factor used by the new cell for deciding which cell cluster to join includes the uplink-downlink configurations used by the respective cell clusters. The following describes how the uplink-downlink configuration used by each cell cluster can be acquired by the new cell, in the context where small cells have no macro cell coverage.

As discussed above in connection with Table 2, the X2 eNB Configuration Update message can be modified to include an UL/DL Configuration Request Indication information element, which can be sent by the new cell to request the uplink-downlink configuration used by the cell cluster identified by each respective candidate CCID.

In response to such request for the uplink-downlink configuration of each cell cluster identified by a respective candidate CCID, the responsive X2 Configuration Update Acknowledge message can include an UL/DL Configuration information element, which identifies the uplink-downlink configuration used by the cell cluster identified by each respective candidate CCID.

The foregoing are examples of X2 messages (modified to include additional information elements) that can be used to obtain certain information for deciding cell clusters to join. Such X2 messages can be provided over a backhaul link by an anchor cell of a cell cluster.

Alternatively, the request for the uplink-downlink configuration of a cell cluster can be included in the X2 Setup Request message, and the uplink-downlink configuration along with the set of candidate CCIDs may be provided in the X2 Setup Response message. In another alternative, if a small cell was previously turned off for power conservation, a neighbor small cell may send an X2 Cell Activation Request message to turn on the new small cell for traffic offloading. In this case, the uplink-downlink configuration along with the set of candidate CCIDs may be provided in the Cell Activation Request message.

Alternatively, instead of acquiring information (including the uplink-downlink configuration) about a cell cluster over a backhaul link, the information can be acquired over the air. The over-the-air technique can be used in deployments where a backhaul link may not exist between the new cell and other cells.

Although the uplink-downlink configuration used by a cell may be available in SIB1 that is broadcast over the air by a cell, use of SIB1 to acquire the uplink-downlink configuration may not be reliable since the uplink-downlink configuration in SIB1 may not be synchronized with the actual uplink-downlink configuration currently used by the cell. This is because that the allowable minimum system information change periodicity is 640 ms, during which one or more dynamic uplink-downlink reconfigurations may have occurred.

The downlink receiver of the eNB of the new cell can measure the Reference Signal Received Power (RSRP) on a subframe basis for each cell cluster. Because there is no cell reference signal in uplink subframes, the eNB of the new cell can use received RSRP to determine the uplink-downlink configuration of the cell cluster.

The following describes examples of acquiring the uplink-downlink configurations of cell clusters in a scenario where small cells have macro cell coverage.

In some implementations, information of a cell cluster can be obtained over a backhaul link (e.g. X2 interface). For the scenario with macro cell coverage, the information can be delivered over X2 interface. In this case, the macro eNB can act as a coordinator and X2 message exchange can occur between the new cell and the macro cell, using X2 messages similar to those discussed above.

Alternatively, the macro cell can directly coordinate and make decision for the new small cell on which cluster to join. The decision is based on coupling loss information and/or possibly location information reported by the new small cell to the macro cell.

As another alternative, the information of a cell cluster can be obtained over the air. For example, the new cell can receive the uplink-downlink configuration of a cell cluster in SIB1 broadcast by the macro cell.

Example Operations

Figure 6:
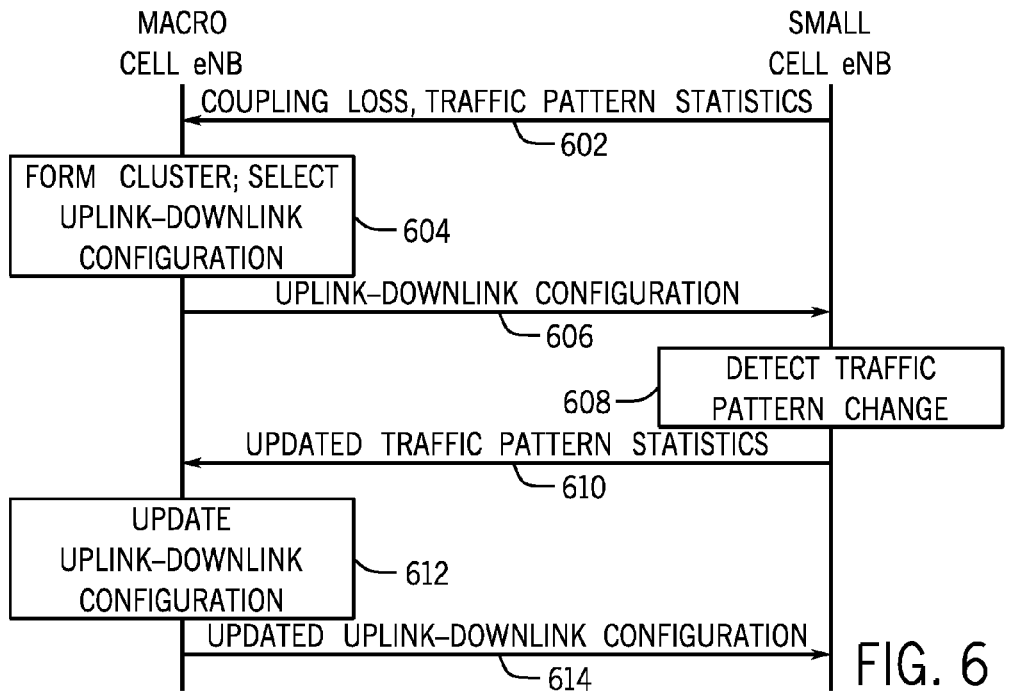
FIGS. 6-8 are message flow diagrams of various example operations, according to further implementations.

FIG. 6 is a message flow diagram of an example operation according to some implementations. In the FIG. 6 example, it is assumed that small cells are under the coverage of a macro cell, where the eNB of the macro cell acts as the coordinating network node 402 (FIG. 4). A small cell eNB reports (at 602) various information to the macro cell eNB, where the information can include coupling loss information (coupling losses of the small cell to other small cells), and traffic pattern statistics (e.g. buffer status and/or packet delay).

Based on the coupling loss information from the small cell eNB (as well as possibly from other small cell eNBs), the macro cell eNB forms (at 604) a cell cluster. Forming a cell cluster can refer to adding the small cell eNB to an existing cell cluster, or forming a new cell cluster. Also, based on the traffic pattern statistics from the small cell eNB (as well as possibly from other small cell eNBs), the macro cell eNB selects (at 604) an uplink-downlink configuration to use for the cell cluster.

The macro cell eNB sends (at 606) information relating to the selected uplink-downlink configuration to the small cell eNB, which uses the selected uplink-downlink configuration in data communications with UEs within the coverage area of the small cell eNB.

Subsequently, in response to detecting a traffic pattern change (at 608), the small cell eNB reports (at 610) updated traffic pattern statistics to the macro cell eNB. If warranted, the macro cell eNB updates (at 612) the uplink-downlink configuration for the cell cluster to a different uplink-downlink configuration. The macro cell eNB then sends (at 614) information relating to the updated uplink-downlink configuration to the small cell eNB.

Figure 7:
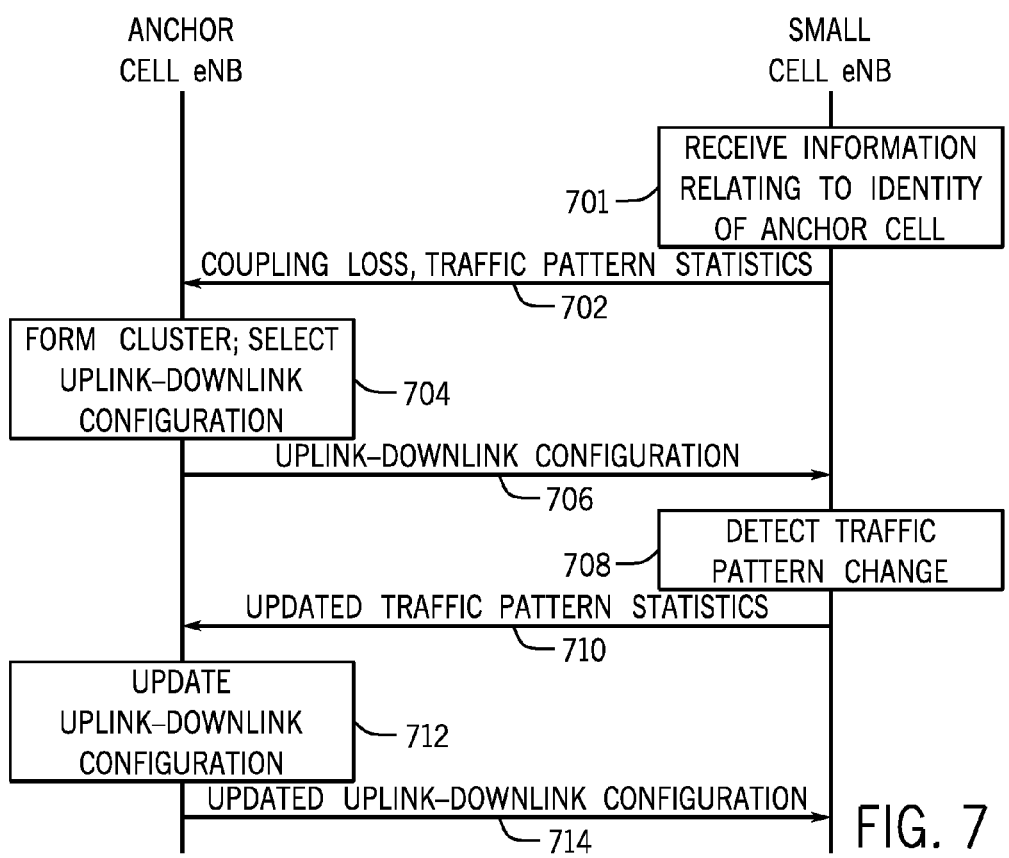

FIG. 7 is a message flow diagram of another example operation that involves a small cell eNB and an anchor cell eNB, which acts as the coordinating network node. The FIG. 7 example operation can be used in cases where small cells are not under the coverage of a macro cell.

The small cell eNB receives (at 701) information relating to the identity of the anchor cell, such as from an OAM server or from another cell (over the air or over a backhaul link). The remaining tasks (702, 704, 706, 708, 710, 712, and 714) in FIG. 7 are the same as corresponding tasks (602, 604, 606, 608, 610, 612, and 614).

Figure 8:
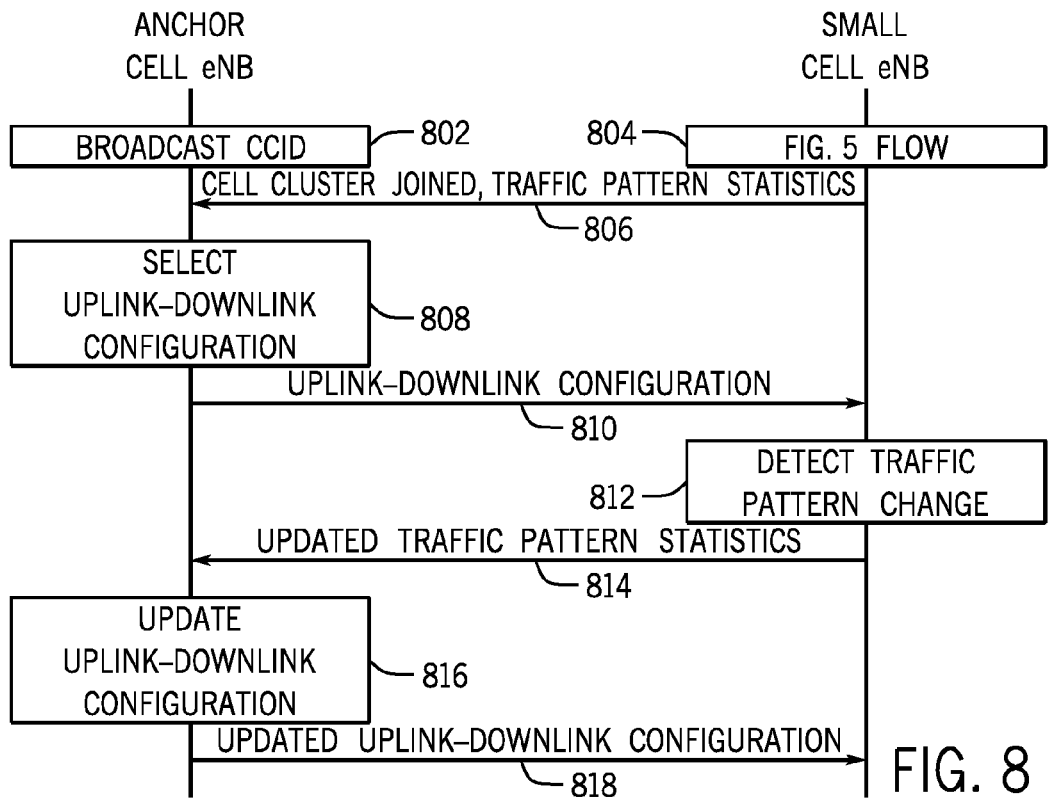

FIG. 8 is a message flow diagram of yet another example operation that involves a small cell eNB and an anchor cell eNB, in an arrangement where small cells do not have macro cell coverage. The anchor cell eNB broadcasts (at 802) its CCID or its PCI, to enable the use by a small cell of the explicit or implicit method, respectively, of deriving a CCID, as discussed in connection with Technique 3 above.

Note that other member cells of the cell cluster of the anchor cell can also broadcast the same CCID or PCI.

The small cell eNB performs (at 804) the flow of FIG. 5, discussed above, which involves acquiring (at 502) a set of candidate CCIDs and selecting one of the cell clusters identified by the candidate CCIDs to join.

Assuming that the small cell eNB has decided to join the cell cluster of the anchor cell eNB of FIG. 8, the small cell eNB sends (at 806) an indication to the anchor cell eNB that the small cell has joined the anchor cell. Also, the small cell eNB can send (at 806) traffic pattern statistics to the anchor cell eNB.

In response to the traffic pattern statistics from the small cell eNB, the anchor cell eNB selects (at 808) an uplink-downlink configuration to use in the cell cluster. The remaining tasks, 810, 812, 814, 816, and 818 of FIG. 8 are the same as corresponding tasks 606, 608, 610, 612, and 614 of FIG. 6.

Techniques or mechanisms according to some implementations allow for more effective formation and operation of cell clusters that mitigate inter-cell interference. In addition, based on use of measured coupling losses, cell clusters can be maintained or updated, such as in response to member cell movement or changing environment conditions. By using coupling losses to decide which cell cluster a new cell should join, cluster boundary interference issues can be mitigated. Also, operation of the cell clusters can be dynamically controlled, including dynamic uplink-downlink reconfiguration, to match changing traffic patterns.

System Architecture

Figure 9:
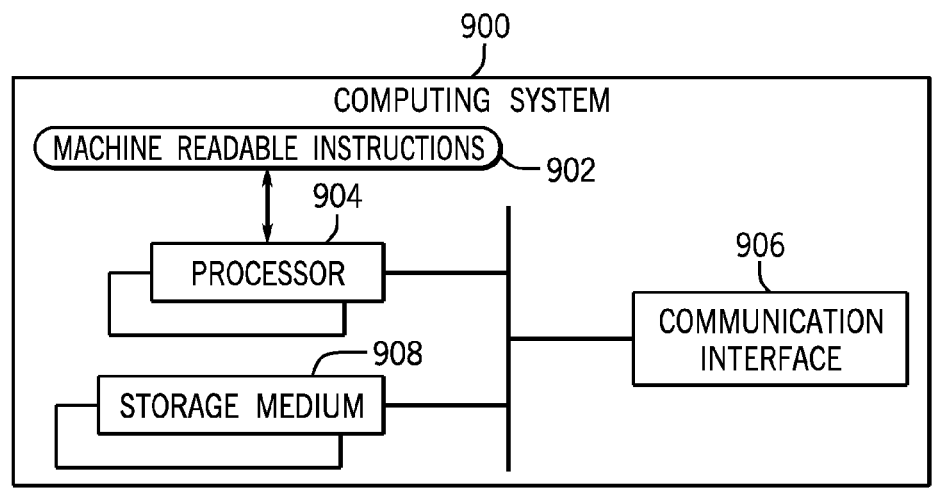
FIG. 9 is a block diagram of the example system according to some implementations.

FIG. 9 depicts a computing system 900, which can be any of the UE or wireless access network node (e.g. small cell eNB, macro cell eNB, or anchor cell eNB) discussed above. The computing system 900 includes machine-readable instructions 902, which are executable on a processor (or multiple processors) 904 to perform various tasks discussed above. A processor can include a microprocessor, microcontroller, processor module or subsystem, programmable integrated circuit, programmable gate array, or another control or computing device.

The processor(s) 904 can be coupled to a communication interface or component 906 to perform communications. For example, the communication component 906 can perform wireless communication over an air interface, or perform wired communication over a wired connection. In some cases, the computing system 900 can include multiple communication components 906 to communicate with respective different network nodes.

The processor(s) 904 can also be coupled to a computer-readable or machine-readable storage medium (or storage media) 908, for storing data and instructions. The storage medium or storage media 908 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving information regarding a traffic pattern of at least one cell in a cluster of cells, the traffic pattern comprising traffic communicated between user equipments (UEs) and the at least one cell, and the information regarding the traffic pattern comprising uplink and downlink buffer status information, and uplink and downlink packet delay information relating to delays in sending uplink and downlink packets between the UEs and the at least one cell; and
   in response to the received information regarding the traffic pattern, selecting, by a coordinating network node for the cluster of cells, an uplink-downlink configuration for use by the cells in the cluster.

2. The method of claim 1, wherein the selecting comprises dynamically changing the uplink-downlink configuration for use by the cells in the cluster to adapt to changing communication conditions.

3. The method of claim 1, wherein the coordinating network node is part of a macro cell or is part of one of the cells in the cluster.

4. The method of claim 1, wherein the receiving comprises receiving information regarding traffic patterns of respective cells in the cluster, and information regarding interference experienced by the respective cells in the cluster.

5. The method of claim 1, wherein the uplink and downlink buffer status information comprises an amount of downlink data in downlink buffers of at least one wireless access network node of the at least one cell, and an amount of uplink data in uplink buffers of the UEs.

6. The method of claim 5, wherein the amount of downlink data in the downlink buffers is an average amount of downlink data in the downlink buffers, and the amount of uplink data in the uplink buffers is an average amount of uplink data in the uplink buffers.

7. The method of claim 1, further comprising receiving proposed uplink-downlink configurations from cells of the cluster, and wherein the selecting is in response to the proposed uplink-downlink configurations.

8. The method of claim 7, wherein each proposed uplink-downlink configuration of the proposed uplink-downlink configurations includes a respective number of uplink subframes and a respective number of downlink subframes, the method further comprising:
   the coordinating network node aggregating the respective numbers of uplink subframes in the proposed uplink-downlink configurations to form an aggregate number of uplink subframes, and aggregating the respective numbers of downlink subframes in the proposed uplink-downlink configurations to form an aggregate number of downlink subframes,
   wherein the selected uplink-downlink configuration is based on the aggregate number of uplink subframes and the aggregate number of downlink subframes.

9. The method of claim 1, further comprising:
   sending, by the coordinating network node in backhaul signaling, information relating to the selected uplink-downlink configuration to cells in the cluster.

10. The method of claim 9, further comprising:
    notifying, by the coordinating network node, cells in the cluster of a system frame number identifying a frame at which the selected uplink-downlink configuration is to be effected.

11. The method of claim 1, further comprising:
    receiving, by the coordinating network node from multiple cells in the cluster, uplink-downlink configurations selected by the respective multiple cells based on communication conditions of the respective multiple cells,
    wherein the selecting is based on the uplink-downlink configurations received from the multiple cells.

12. The method of claim 1, wherein the coordinating network node is part of a first cell in the cluster, and wherein selecting the uplink-downlink configuration is based on the information regarding the traffic pattern of the first cell, and information regarding interference experienced by the first cell.

13. The method of claim 12, further comprising:
    receiving, by the coordinating network node, information from at least a second cell in the cluster, the information sent by at least the second cell in response to at least the second cell requesting a uplink-downlink configuration different from the selected uplink-downlink configuration; and
    deciding, by the coordinating network node, whether or not to change the selected uplink-downlink configuration in response to the received information from at least the second cell.

14. The method of claim 1, further comprising:
    cooperating, by the coordinating network node with another node, to merge multiple clusters of cells.

15. The method of claim 1, further comprising:
    forming, by the coordinating network node, the cluster of cells in response to at least coupling loss information from the cells of the cluster.

16. A wireless access network node comprising:
a non-transitory storage medium storing instructions; and
at least one processor, the instructions executable by the at least one processor to:
- send, to a coordinating network node, information regarding a traffic pattern of a first cell in a cluster of cells, and information regarding interference of the first cell, the traffic pattern comprising traffic communicated between user equipments (UEs) and the first cell, and the information regarding the traffic pattern comprising uplink and downlink buffer status information, and uplink and downlink packet delay information relating to delays in sending uplink and downlink packets between the UEs and the first cell; and
- receive, from the coordinating network node, an uplink-downlink configuration selected by the coordinating network node in response to the information regarding the traffic pattern and the information regarding the interference, the selected uplink-downlink configuration for use by cells in the cluster, wherein the wireless access network node is part of the first cell in the cluster.

17. The wireless access network node of claim 16, wherein the information regarding the interference comprises information regarding interference experienced by the wireless access network node due to transmissions of another cell.

18. The wireless access network node of claim 16, wherein the uplink and downlink buffer status information comprises an amount of downlink data in downlink buffers of the wireless access network node, and an amount of uplink data in uplink buffers of the UEs.

19. A wireless access network node comprising:
a non-transitory storage medium storing instructions, and
at least one processor, the instructions executable by the at least one processor to:
- upon startup of the wireless access network node, obtain a plurality of cell cluster identifiers that identify respective clusters of cells;
- receive measurements of reference signals transmitted by cells of the clusters, the measurements made by the wireless access network node;
- determine, based on the measurements, coupling losses between the wireless access network node and the cells of the clusters; and
- select one of the clusters to join based on the coupling losses and on respective uplink-downlink configurations used by the clusters.

20. The wireless access network node of claim 19, wherein the cell cluster identifiers are obtained from a server, over a backhaul link from at least one cell, over-the-air from at least one cell, or from a macro cell.

21. The wireless access network node of claim 19, further comprising a communication component configured to:
- communicate cluster information over a backhaul link with a cell or in system information transmitted wirelessly with a cell.

22. The wireless access network node of claim 19, wherein the at least one processor is configured to further derive at least one cell cluster identifier from a at least one physical cell identifier.

* * * * *